United States Patent [19]

Krupicka

[11] 4,251,076
[45] Feb. 17, 1981

[54] GOLFING AID

[76] Inventor: Gerald A. Krupicka, 3584 Turner Rd., SE., Salem, Oreg. 97302

[21] Appl. No.: 959,229

[22] Filed: Nov. 9, 1978

[51] Int. Cl.³ .............................................. A63B 69/36
[52] U.S. Cl. ................................ 273/183 B; 351/158; 351/45
[58] Field of Search ........... 273/183 B, 190 A, 183 E, 273/54 B, 190 R; 33/262; 351/45, 51, 158, 166; 128/76.5

[56] References Cited

U.S. PATENT DOCUMENTS

| | | | |
|---|---|---|---|
| 1,510,850 | 10/1924 | Jacobs et al. | 351/45 |
| 2,330,442 | 9/1943 | Nero | 273/190 A |
| 3,264,002 | 8/1966 | Palumbo | 273/183 B |
| 3,487,549 | 1/1970 | Engesser | 273/183 B X |
| 3,498,293 | 3/1970 | Oppenheimer | 351/158 X |
| 3,871,104 | 3/1975 | Underhill | 273/183 B X |

FOREIGN PATENT DOCUMENTS

| | | | |
|---|---|---|---|
| 570688 | 10/1961 | Belgium | 351/158 |
| 414838 | 8/1934 | United Kingdom | 351/158 |

*Primary Examiner*—George J. Marlo
*Attorney, Agent, or Firm*—Eugene M. Eckelman

[57] ABSTRACT

A spectacle-type frame has a pair of open frame portions with a first alignment bar mounted across them by means of which a golfer wearing the frame lines up the direction of travel of a golf ball between an adjacent point and a distant point. A pair of second alignment bars extend at right angles to the first alignment bar at the respective open frame portions. These second alignment bars form a single focus line with the golfer's eyes and the golfer lines up the face surface of a golf club with such focus line for causing a golf ball when struck to travel accurately along the line determined by the first bar. The first alignment bar is adjustable for positioning it in proper alignment with the golfer's eyes and the second alignment bars are adjustable to provide the common focus line with the golfer's eyes.

1 Claim, 4 Drawing Figures

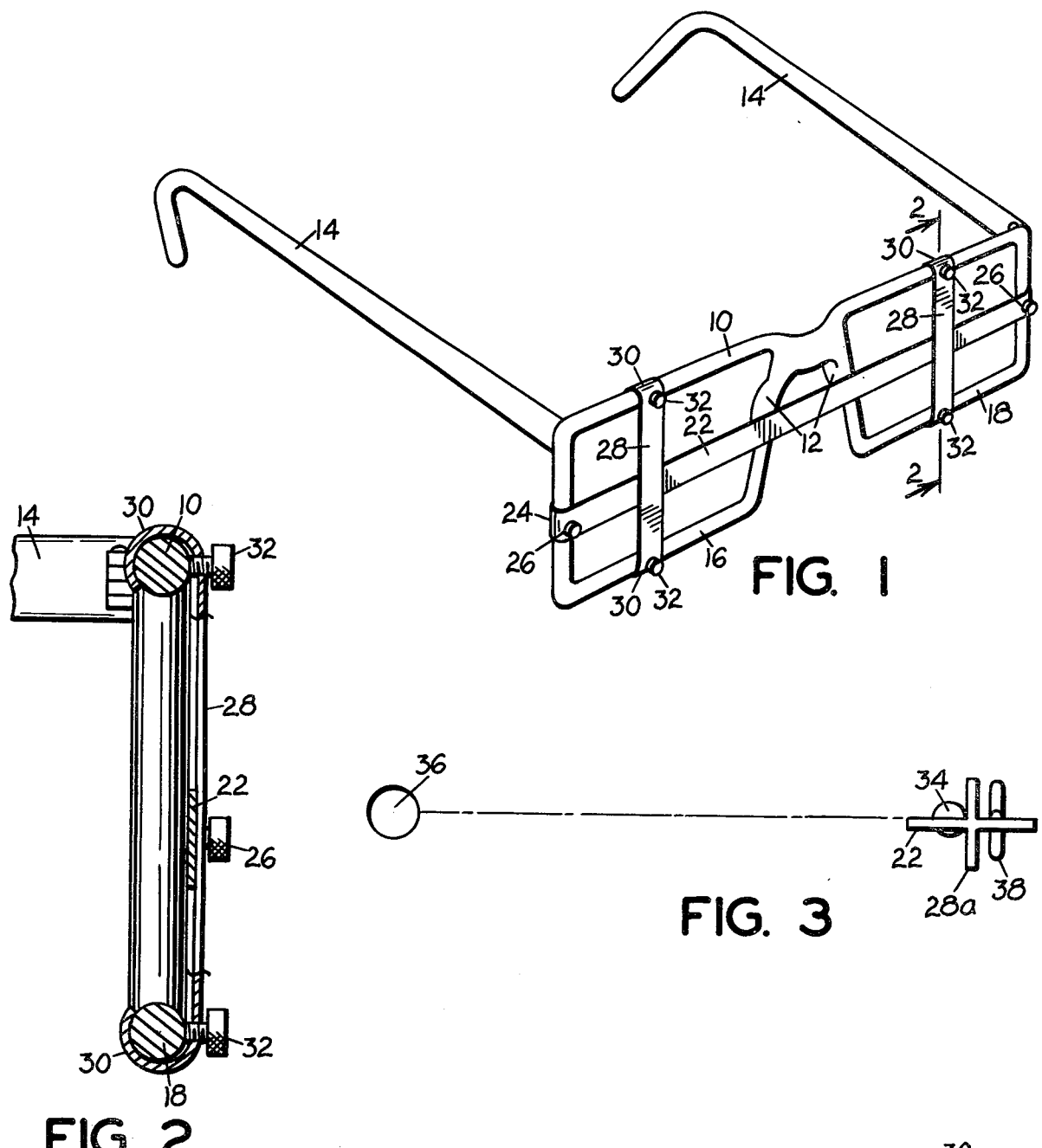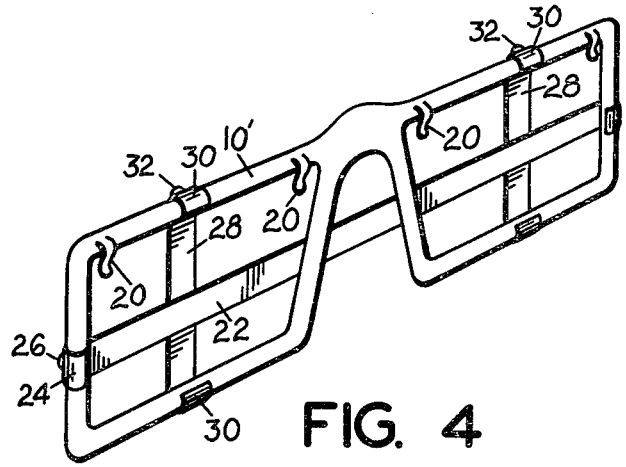

GOLFING AID

BACKGROUND OF THE INVENTION

This invention relates to new and useful improvements in golfing aids and particularly pertains to an aid designed to line up the direction of travel that a golf ball will take as it leaves the face surface of the golf club.

Various types of golfing aids have heretofore been provided for the purpose of assisting golfers in hitting straight shots. One aid for example as shown in U.S. Pat. No. 3,951,414 provides a device for aligning a golfer's dominant eye with a golf ball, such device being attachable to the head of a golfer and has means to cover the non-dominant eye. Other devices are employed that consist of head-mounted aids intended to provide better concentration in striking the ball or to maintain the fundamental head-down position. Although such prior devices may provide some aid for their intended purpose, they do not provide a fully aligning aid which not only lines up the direction of travel that a golf ball will take between an adjacent point and a distant point but also lines up the face surface of a golf club with such direction of travel.

SUMMARY OF THE INVENTION

According to the present invention and forming a primary objective thereof, a golfing aid is provided which serves accurately to line up the direction of travel that is desired for a golf ball to take and in addition to line up the face surface of the golf club with such direction of travel, thus providing a more accurate aid, particularly for putting, than devices heretofore employed.

In carrying out the objectives of the invention, a spectacle-type frame includes first alignment means mounted thereacross by means of which the golfer lines up the direction of travel between an adjacent point and a distant point and second alignment means extending across said first alignment means by means of which the golfer lines up the face surface of a golf club for movement in the direction of travel determined by said first alignment means. The alignment means are adjustable to accommodate a particular golfer. The invention includes means for mounting it on the nose and ears of a golfer or alternatively on existing spectacles.

The invention will be better understood and additional objects and advantages will become apparent from the following description taken in connection with the accompanying drawings.

BRIEF DESCRIPTION OF THE DRAWINGS

FIG. 1 is a perspective view of a golfing aid embodying features of the present invention, this embodiment having side bows for mounting on a golfer's head;

FIG. 2 is an enlarged sectional view taken on the line 2—2 of FIG. 1;

FIG. 3 is a diagrammatic view of an aligning process accomplished by the instant golfing aid; and FIG. 4 is a perspective view of an embodiment of the invention utilizing clip means for attaching it to existing spectacles.

DETAILED DESCRIPTION OF PREFERRED EMBODIMENTS

With particular reference to the drawings, and first to FIGS. 1 and 2, the numeral 10 designates a spectacle-type frame having a central nose engaging bridge 12 and foldable side bows 14. The frame 10 includes two frame portions 16 and 18 which are open and which have substantially straight defining portions at the top, bottom and outer sides. With reference to FIG. 4, it is apparent that a spectacle-type frame 10', instead of employing bows 14, can be provided with clips 20 for mounting on existing spectacles.

A first aligning means in the form of a bar 22 extends across the frame 10 and has end arcuate portions 24 which extend over the ends of the frame for attaching this bar to the frame. Set-screws 26 are threadedly mounted in the bar 22 for abutment against the frame and are arranged to securely hold the bar 22 in an adjusted position between the top and bottom of the frame portions 16 and 18.

Second aligning means comprise upright bars 28 mounted one on each side frame portion 16 and 18 at right angles across the bar 22. These bars also have end arcuate portions 30 with set-screws 32 for holding them in selected adjusted positions laterally of the respective frame portions 16 and 18.

In preparing the golfing aid for use, the cross bar 22 is first adjusted on the frame between upper and lower portions to position it selectively to the eyes of a particular golfer. That is, this bar is positioned such that it will be on the ball in the normal tilt of the golfer's head in his address to the ball. This position of the bar is different for each person since each person generally has a different head position when addressing the ball. Once the adjustment is made the bar 22 is fixedly positioned by means of the set screws 26.

The next step in preparing the aid for use comprises adjusting the vertical bars 28 toward and away from each other selectively such that they produce a single focus line with the two eyes of the golfer. The bars will thus appear as a single line.

With particular reference to FIG. 3, the golfer in using the aid first aligns the bar 22 between the golf ball 34 and a point 36 to which the ball is to move, such as the hole in a green. The golfer then pivots his head to place the focus line 28a, which comprises the single focus line developed by the two bars 28, directly behind the ball 34. Thereupon the golfer aligns the hitting surface of golf club 38 in parallelism with focus line 28a. It is merely necessary then to keep the club parallel with the focus line 28a as it strikes the ball whereby the ball will travel precisely along the intended line.

While the present golfing aid is particularly useful to improve putting alignment, it can as well be used off the tees or fairways for other shots, such aid assisting the golfer in getting the head of his golf clubs squared to the intended line of flight of the ball. The bars 22 and 28 are approximately one quarter inch in width for best aligning functions, although it is to be understood that other dimensions of these bars may be employed. The wide engagement of arcuate portions 32 of bars 28 insures that the latter will adjust to and be maintained at right angles to the bar 22.

It is to be understood that the forms of my invention herein shown and described are to be taken as preferred examples of the same and that various changes in the shape, size and arrangement of parts may be resorted to without departing from the spirit of my invention, or the scope of the subjoined claims. Frame portions 16 and 18 may be provided with corrective lens if necessary or desired.

Having thus described my invention, I claim:

1. A golfing aid arranged to assist a person in lining up the direction of travel that a golf ball will take as it leaves a face surface of a golf club, said golfing aid comprising (a) a spectacle-type frame having opposite sides and upper and lower ends, (b) means on said frame arranged to hold it on a golfer's head adjacent the eyes, (c) a first alignment bar, (d) mounting means mounting said bar across said frame in front of both eyes of a golfer when said frame is worn on the head and being arranged to line up the direction of travel of a golf ball between an adjacent point and a distant point, (e) said mounting means having an adjustable connection with said frame to adjust it between said upper and lower ends for proper alignment with the golfer's eyes, (f) a pair of second alignment bars, (g) and mounting means mounting said second alignment bars in upright position on said frame in intersecting relation with said first alignment bar and in spaced relation with each other so as to be positioned in front of respective eyes of the golfer, (h) the mounting means for each of said second alignment bars having individual adjustable connection with said frame to provide adjustment of said second alignment bars to form a common focus line for the eyes of the golfer which is arranged to be lined up with the face surface of a golf club to cause the face surface of the golf club to be selectively positioned for intended direction of travel of a golf ball.

* * * * *